United States Patent [19]

Newman

[11] Patent Number: 5,066,175

[45] Date of Patent: Nov. 19, 1991

[54] CUTTING TOOL ASSEMBLY

[76] Inventor: Carl M. Newman, 61 Birch Ave., Northfield, Ohio 44067

[21] Appl. No.: 603,956

[22] Filed: Oct. 26, 1990

[51] Int. Cl.$^5$ .............................................. B23B 51/00
[52] U.S. Cl. .................... 408/231; 279/2 R; 407/50; 408/713
[58] Field of Search ................ 279/2 R, 36; 407/49, 407/50; 408/199, 200, 227, 228, 231, 232, 233, 240, 238, 239 R, 713

[56] References Cited

U.S. PATENT DOCUMENTS

| 1,135,546 | 4/1915 | Ondra | 279/2 R |
| 2,689,131 | 9/1954 | Priest | 279/101 |
| 3,106,112 | 10/1963 | Hanson | 408/231 |
| 3,437,362 | 4/1969 | Offenbroich | 279/2 R |
| 4,120,601 | 10/1978 | Benjamin | 408/223 |
| 4,292,866 | 10/1981 | Kaczynski | 407/50 |
| 4,764,064 | 8/1988 | Grienke | 409/233 |

FOREIGN PATENT DOCUMENTS 1018697 10/1957 Fed. Rep. of Germany ..... 279/2 R

Primary Examiner—Daniel W. Howell

[57] ABSTRACT

A cutting tool assembly is disclosed as having a cutting blade of U-shape and a holder with flexible arms which may be expanded to grip the cutting blade.

11 Claims, 1 Drawing Sheet

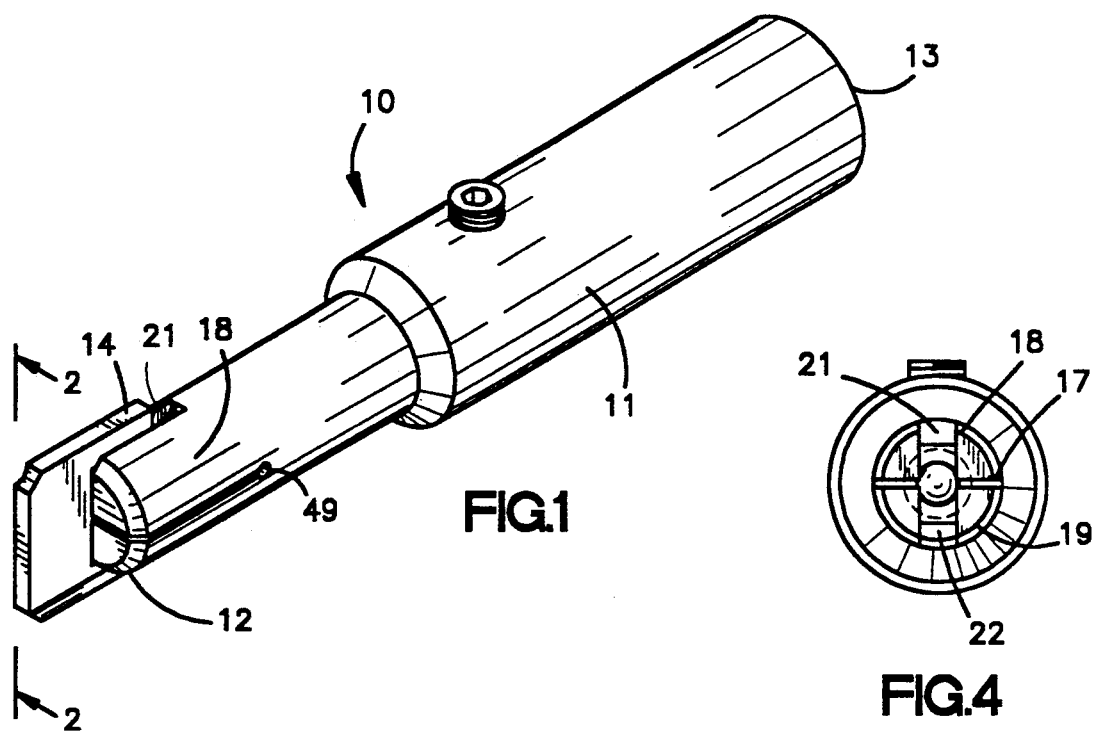
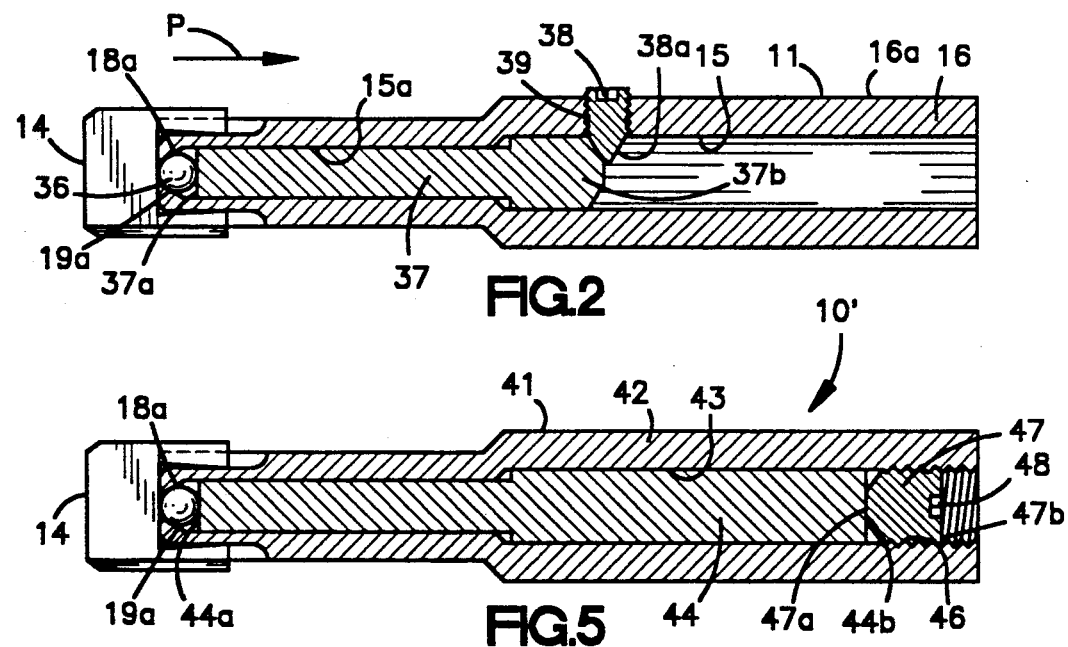
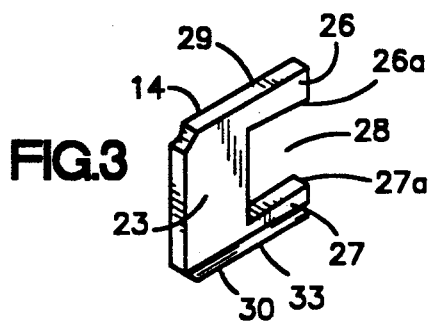
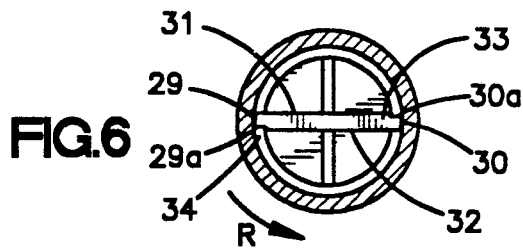

CUTTING TOOL ASSEMBLY

This invention relates to a tool assembly for performing a cutting operation and more particularly to a tool assembly having a replacable cutting blade for reaming the inner wall of a workpiece such as a tube, hole or the like.

BACKGROUND OF THE INVENTION

A variety of cutting tool arrangements are available today for carrying out a precision cutting operation and, in particular, a reaming operation by means of which a precise and smooth inner diameter is produced on the inner wall of tubes, machined holes in workpieces and the like. For instance, such tools commonly referred to as "reamers" may be of the multifluted type having a plurality of circumferentially spaced cutting edges for removing a very thin layer of material in a smooth and dimensionally accurate manner.

Such reamers are usually of unitary construction adapted to be supported for rotation in a suitable machine tool for the reaming operation. In addition, many of such present-day types of such reamers are provided with removable cutting blades so that such blades can be replaced when worn. The use of replaceable elements in such tool assemblies does provide certain advantages but often require replacement of major portions of the cutting tool.

While such present day reaming tools perform with a reasonable degree of satisfaction, room for improvement in such tools still exists. In some cases, where high tolerances and/or a high degree of smoothness is sought, the results often fall short of these objectives.

It can be understood, as with any type of cutting tool, wearing of the blade cutting edges is rapid requiring blade replacement and/or edge sharpening which in present-day tool construction, is time consuming and expensive even when replaceable cutting blades are utilized. Furthermore, present-day machine tools with which such reaming tools are associated are designed to carry out a reaming operation with vertical movement of the tool creating undesirable vibrations leading to inaccuracies as well as creating problems with chipremoval and/or tool cooling. These problems are magnified when older machine tools with worn slides or the like are used.

U.S. Pat. No. 2,689,131-Priest shows a boring tool having a blade which is removably attached to a shank by a slot arrangement and a threaded collar.

U.S. Pat. No. 4,120,601-Benjamin discloses a spade drill, the blade of which is removably attached to a holder by means of slots and a socket headed cap screw.

U.S. Pat. No. 3,067,638-Eckardt shows a ball floating reamer which is provided with a spherical cutter with a U-shaped retainer on a housing and a spring and ball arrangement to permit the cutter to roll to an exact center point.

U.S. Pat. No. 4,473,070-Matthews et al shows a reamer with a U-shaped replaceable blade which is releasably locked to a supporting body member.

None of the above-listed patents discloses a reamer which has a replaceable blade similar to that of the instant invention.

OBJECTS AND SUMMARY OF THE INVENTION

Accordingly, a primary object of the invention is to provide a new and novel cutting tool assembly for performing a reaming operation in a highly efficient and accurate manner.

Another object of the invention is to provide a new and novel cutting tool assembly which utilizes a disposable cutting blade which is simple and inexpensive in construction, which is capable of prolonged use with a minimum of wear, and in which the blade is securely retained in the operative position while permitting easy replacement.

A further object of the invention is to provide a new and novel cutting tool assembly for a reaming operation which minimizes blade overhang, which permits extremely close tolerances to be obtained on the workpiece and which eliminates chip packing in the reaming of blind holes.

Still another object of the invention is to provide a new and novel cutting tool assembly for a reaming operation which may be used with a minimum of vibration so as to avoid inaccuracies, which permits the reaming operation to be carried out on a horizontal axis and which permits the replacement of worn blades while the assembly remains in position on the supporting machine tool.

A still further object of the invention is to provide a new and novel cutting tool assembly which permits the reaming of very small interiors in a workpiece and which avoids excessive reamer breakage.

The objects of the invention and other related objects are accomplished by the provision of a substantially cylindrical holder member having an outer surface with front and rear ends and a central bore together with a cutting blade having cutting edges and an outwardly opening recess for accommodating the holder member front end so as to position the blade in an operative position. The holder member front is provided with a diametrically extending slot forming a pair of oppositely disposed flexible arms and means are provided in the holder member central bore for releasably spreading the pair of arms radially outward in opposite directions into clamping engagement with the cutting blade in the operative position of the blade thereby retaining the cutting blade on the holder member for a reaming operation.

BRIEF DESCRIPTION OF THE DRAWING

FIG. 1 is a perspective view of one embodiment of the cutting tool assembly of the invention;

FIG. 2 is a sectional view of the tool assembly of the invention taken substantially along line 2—2 of FIG. 1;

FIG. 3 is a perspective view of the cutting blade used in the tool assembly of the invention;

FIG. 4 is an end view of the tool assembly of the invention with the cutting blade removed;

FIG. 5 is a sectional view similar to FIG. 2 illustrating a second embodiment of the tool assembly of the invention; and FIG. 6 is an end view partially in section of the tool assembly of the invention during a reaming operation.

DESCRIPTION OF THE PREFERRED EMBODIMENTS

Referring now to the drawing and to FIG. 1 in particular, there is shown a cutting tool assembly constructed in accordance with the invention and designated generally by the reference numeral 10. The tool assembly 10 includes a substantially cylindrical holder member 11 formed of metal or the like having a front end 12, a rear end 13 and a cutting blade 14 preferably formed of tool steel adapted to be detachably mounted on the holder member front end 12 in an operative position as shown. As can be understood, the cutting tool assembly 10 is utilized for a metal cutting or removing operation such as in particular, a reaming operation.

As shown best in FIG. 2, the holder member 11 includes a central bore 15 extending longitudinally between the front and rear ends 12, 13 so as to provide a side wall 16 having an outer surface 16a.

A diametrically extending slot 17 is provided in the front end 12 of the holder member 11 and the slot 17 extends through the side wall 16 to form a pair of spaced-apart, flexible arms 18, 19. The outer surfaces of each of the arms arms 18, 19 are provided with a centrally positioned, longitudinally extending groove 21, 22 respectively.

Referring now to FIG. 3, there is shown the cutting blade 14 of the invention which is of U-shaped configuration having a bight portion 23 and a pair of leg portions 26, 27 defining a recess 28 adapted to accommodate the front end 12 of the holder member 11. The blade 14 includes substantially planar top and bottom edge portions 29, 30 which are preferably beveled as shown in FIG. 6 so that the leading edges 29a, 30a form a cutting edge in the direction of rotation of the tool assembly during a remaining operation as indicated by the arrow R in FIG. 6.

In addition, the blade 14 includes side faces 31, 32 in each of which a longitudinally extending groove 33, 34 respectively may be provided in closely spaced, parallel relationship with the cutting edges 29a, 30a to increase the flexibility of the cutting edges.

Furthermore, the leg portions 26, 27 include inner surfaces 26a, 27a respectively which are in a slightly tapered, converging relationship outwardly from the bight portion 23.

To position the blade 14 on the holder member 11, the blade is moved in the direction of the arrow P in FIG. 2 so that the leg portions 26, 27 enter the grooves 21, 22 on the arms 18, 19 respectively until the bight portion 23 abutts the holder member front end 12. The tapered surfaces 26a, 27a on the leg portions 26, 27 together with the flexibility of of the arms 18, 19 provide a snug fit.

Means are provided in the holder member central bore for releasably spreading the pair of arms 18, 19 radially outward in opposite directions into clamping engagement with the cutting blade 14 in the operative position of FIGS. 1, 2. More specifically, a spherical member or ball 36 is disposed in the central bore 15 for freely slidable movement into the bore portion defined by the arms 18, 19. It will be noted that the central bore 15 is provided with a portion of reduced diameter 15a which provides arcuate camming surfaces 18a, 18a on the inner surfaces of the arms 18, 19 respectively against which the ball 36 abutts.

On the other side of the ball 36 from the camming surfaces 18a, 19a, a push rod 37 is disposed within the central bore 15 for freely slidable movement, the front end 37a of the rod 37 adapted to abut the ball 36. In the embodiment of FIGS. 1, 2, the other end of the rod 37 is provided with a conical end 37b. An externally threaded set screw 38 having a conical tip 38a is positioned within an internally threaded radial passage 39 in the holder member side wall 16.

The length of the push rod 37 is selected so that when the set screw 38 is moved radially inward, the conical tip 38a engages the conical end 37b of the push rod 37 moving the rod progressively forward whereby the rod front end 37a moves the ball 36 forward against the arcuate camming surfaces 18a, 19a of the arms 18, 19 respectively to clamp the arms against the leg portions 26, 27 of the blade 14, the radial position of the set screw 38 determining the clamping force applied to the arms 18, 19.

Thereby, the cutting blade 14 is securely held in the operative position within the tool assembly 10 which is mounted in the well-known manner on an associated machine tool for a reaming operation.

Referring now to FIG. 5, there is shown, in a sectional view similar to FIG. 2, another embodiment of the invention. In FIG. 5, wherein like numerals are used to identify like parts, the tool assembly identified by the reference numeral 10', includes a holder member 41 having a side wall 42 and a central bore 43. The means for releasably urging the ball 36 against the camming surfaces 18a, 19a include an elongated push rod 44 disposed with the central bore 43, the rod including a front end 44a and a rear end 44b.

The cental bore 43 includes an internally threaded portion 46 at the end of the holder member 41 opposite the blade 14 for receiving an externally threaded set screw 47 having a front face 47a. A slot 48 is provided in the rear face 47b of the set screw 47 by means of which the set screw is engaged by a suitable tool to move the set screw within the threaded bore portion 46 for engagement of the set screw front face 47a with the push rod rear end 44b to clamp the blade 14 on the holder member 41 as in the previous embodiment.

In order to increase the flexibility of the arms 18, 19, the slot 17 terminates in an enlarged area 49 at the base of the arms 18, 19 thereby forming a pivot point around which the arms will bend during the spreading movement of the arms.

What is claimed is:

1. A cutting tool assembly for a cutting operation such as reaming or the like, said tool assembly comprising, in combination: a substantially cylindrical holder member having an outer surface, a front end, a rear end, and a central bore, said front end having a diametrically extending slot to form a pair of oppositely disposed, flexible arms; a cutting blade having cutting edges and an outwardly opening recess for accommodating said front end of said holder member to position said cutting blade for a cutting operation; and means in said holder member central bore for variably spreading said pair of arms radially outwardly in opposite directions into clamping engagement with said cutting blade on said holder member front end, thereby retaining said cutting blade for said cutting operation; wherein said cutting blade is of U-shaped configuration having a bight portion and a pair of leg portions defining said recess and means on each of said oppositely disposed arms for slidably accommodating a respective one of said leg portions in said cutting position of said blade.

2. A cutting assembly in accordance with claim 1 wherein said means for slidably accommodating said leg portions include a longitudinally extending slot in the outer surface of each of said oppositely disposed arms.

3. A cutting assembly in accordance with claim 2 wherein each of said leg portions include an inner surface adjacent said recess, said inner surfaces being disposed in a tapered, converging relationship outwardly from said bight portion.

4. A cutting assembly in accordance with claim 1 wherein said means for variably spreading said oppositely disposed arms include a spherical member in said central bore position to engage said arms with the inner surface of said oppositely disposed arms, a rod member slidably disposed within said central bore for engagement with said spherical member and means for releasably urging said rod member into engagement with said spherical member to move said arms into said clamping engagement with cutting blade on said holder member.

5. A cutting assembly in accordance with claim 4 wherein said rod member urging means include camming means on said holder member for camming engagment with one end of said rod member.

6. A cutting assembly in accordance with claim 5 wherein said camming means includes an internally threaded, radially extending passage in said holder member communicating with said central bore, an externally threaded camming member having a conical tip movable within said passage and wherein said rod member includes a conical and portion engageable by said camming member conical tip for camming said rod member axially into said urging engagement with said spherical member.

7. A cutting assembly in accordance with claim 4 wherein said rod member urging means includes an internally threaded end portion on said rear end of said holder member, an externally threaded end plug receivably within said internally threaded end portion for engagement with the adjacent end of said rod member to move said rod member axially into said urging engagement with said spherical member.

8. A cutting assembly as claimed in claim 4 wherein each of said arms includes an inner surface defining said slot, said inner surfaces including an arcuate portion for camming engagement with said spherical member.

9. A cutting assembly as claimed in claim 8 wherein said cutting blade includes substantially planar, oppositely tapered top and bottom edge portions, the leading edge of each of said edge portions in the direction of rotation of said holder member forming the cutting edge for said cutting operation.

10. A cutting assembly as claimed in claim 9 wherein said cutting blade further comprises a pair of side faces and wherein each of said side faces include an elongated groove extending in a closely spaced, parallel relationship with an associated one of said cutting edges.

11. A cutting assembly as claimed in claim 10 wherein said arms include a base forming a pivot point for said spreading of said arms and wherein said slot terminates in an enlarged area at said pivot point.

* * * * *